Figure 2:
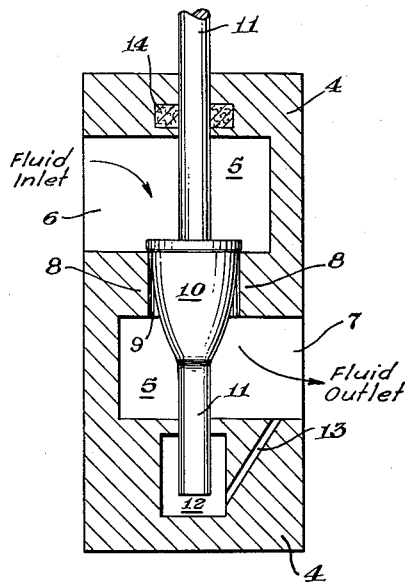

Dec. 19, 1961     E. S. DE HAVEN     3,013,767

VALVE

Filed May 27, 1957

INVENTOR.
Eugene S. DeHaven

BY

Griswold & Burdick
ATTORNEYS

United States Patent Office 3,013,767
Patented Dec. 19, 1961

3,013,767
VALVE
Eugene S. De Haven, Walnut Creek, Calif., assignor to The Dow Chemical Company, Midland, Mich., a corporation of Delaware
Filed May 27, 1957, Ser. No. 661,683
4 Claims. (Cl. 251—122)

It may frequently be desirable or necessary to accurately control the flow of liquid high polymer compositions, including polymers in solution and the like highly viscous liquids, during their handling and transfer for various purposes by value means that have other-than-linear response, such as semi-logarithmic, characteristics. Quite often, it is advantageous to effect such control by means of and through motor operated valve units. Unfortunately, however, the standard and conventionally designed control valves that are available are not well suited for satisfactory employment in such service. The standard valves are generally intended for utilization with liquids that are moving in turbulent flow. Consequently, when they are employed with viscous liquids, they exhibit an approximately "on-off" behaviorism due to their particular structural characteristics. Thus, they generally fail to provide suitable modulating control when they are used to handle the indicated varieties of viscous liquids.

The major design and concern of the present invention is to provide an improved control valve particularly adapted for the handling of high polymer compositions and the like viscous liquids that would be capable of proportionally regulating the flow of the liquid in a semilogarithmic relationship to the valve setting or position and which would be especially well suited for installation and use in and with standard proportional-motor, valve-operating units.

To the realization of these and related ends a control valve in accordance with the present invention is most advantageously comprised of a means defining a body having an internal cavity therein and formed with inlet and outlet ports leading into and out of said cavity; a valve seat in said cavity positioned between said inlet and outlet ports and having a relatively deep, cylindrical opening formed therein to provide communication between said inlet and outlet ports; a relatively long, tapered plug coaxial with the deep opening in said seat and at least coextensive therewith, said tapered plug being formed to provide a constantly uniformly increasing annular space with said seat as said plug is elevated or lifted coaxially out of the opening and off of said seat, said plug being further adapted by its taperd configuration to permit the liquid being handled to flow in a viscous, non-turbulent manner from said inlet through the annular space formed between said tapered plug and said opening in said seat to said outlet at any relative open position of said plug (or setting of said valve) when the plug is lifted from the seat; and means in said valve for changing the position of said plug in said opening with respect to said seat. Beneficially, in the conventional manner, a protuberant shut off closure or sealing shoulder may be provided at the top of the tapered plug in order to completely restrict or stop the flow of liquid through the valve when so desired. The arrangement of such closure should be such that its only influence on the flow characteristics of the liquid passing through the valve when the shoulder is in a flow-affecting proximity to the seat occurs in the small flow range that is actually less than the minimum flows desired to be regulated for control purposes.

Advantageously, the valve is designed with characteristics such that the purposive flow rate ($q$) that is afforded in the range or portion of regulated flow by the valve (as a volumetric percentage of the maximum flow rate of which it is capable when operated wide open under given conditions with a given liquid) is related to the lift position(s) or valve setting (as a measured percentage of the total lift of the plug off the seat when the valve is wide open) that is necessary to obtain such flow by the expression:

$$q = \phi s \tag{1}$$

and the rate of flow (Q) at any valve setting through the annular space between the tapered plug and the cylindrical opening in the seat is in approximate conformance with the formula:

$$Q = \frac{bY^3}{12U} \cdot \frac{dP}{dL}\left[1 + \frac{3}{20}CY^2\left(\frac{dP}{dL}\right)^2\right] \tag{2}$$

wherein, in consistent units of measure, $b$ is the mean circumference of the annular channel opening at its narrowest point between the tapered plug and the seat; Y is the radial clearance of the annular channel opening at its narrowest point between the tapered plug and the seat; L (or $dL$) is the differential length of the passage measured from the top of the seat to the termination of the portion of the plug that is within the seat bore; P (or $dP$) is the differential pressure drop of the liquid across the valve; U is the zero-shear viscosity of the viscous liquid being handled (as may be determined by conventional tests, such as with Brookfield viscosity measuring apparatus, in which various readings taken at different rates of rotation or shear values are extrapolated to zero-shear); and C is the pseudoplasticity constant of the liquid when it is a non-Newtonian fluid, which constant is zero in the ideal case of a true Newtonian viscous fluid. Obviously, the consistent units of measure may be taken in either the English or metric systems.

As is understood by those who are skilled in the art, the pseudoplasticity of a liquid is an indication of the departure in the behaviorism of the liquid from that which may be associated with Newtonian fluids. To illustrate, a pseudoplastic fluid will decrease in consistency apparent viscosity) as the rate of shear (velocity gradient) that is applied to it increases. In a Newtonian fluid, however, the consistency is independent of rate of shear. Usually a pseudoplastic fluid is found to approach a lower consistency as a limit, as indicated in the relationship that is graphically portrayed in FIGURE 1 of the accompanying drawing. The pseudoplasticity constant of a viscous liquid which, in the English system is expressed in units of feet to the fourth power per pounds of force squared, is an empirical value that ordinarily may be evaluated by solution of the following equation for "C" after the values for the other variables have been determined by observation and measurement of the viscous flow of a given pseudoplastic liquid in a given tube:

$$Q = \frac{\text{pi } D^4P}{128uL}\left[1 + \frac{2}{3}C\left(\frac{DP}{4L}\right)^2\right] \tag{3}$$

wherein, in consistent units, D is the diameter of the tube; P is the pressure difference across the tube; L is the length of the tube; $u$ is the zero-shear viscosity of the liquid; pi is the value of the ratio of the circumference of a circle to its diameter which, with suitable accuracy for present purposes, is 3.141 and Q is the flow rate.

More advantageously, valves that are in accordance with the present invention are designed with semi-logarithmic characteristics so that the expression of the purposive flow rate ($q$) in the portion of regulated flow is as follows:

$$\log_{10} q = A + Bs \tag{4}$$

wherein A is a constant that sets the lower regulated flow limit and is the logarithm of the minimum flow that is desired to be regulated in the valve, expressed as a percentage of the maximum attainable flow with the valve in a wide open position, and B is a constant that is selected to provide $q$ with a value of 100 percent when $s$ is 100 percent (or vice versa). As is apparent, the constant B affects the rangeability of the valve. Thus, it must be a number which will permit $q$ to vary from some finite number, regardless of how small, to 100. Likewise, the constant A, as mentioned, sets the lower regulated flow limit of the valve. Thus, if 2 percent of the maximum possible flow through the valve is desired when the valve is set in its most throttled position or at its minimum regulated flow rate, A will be the logarithm of the number 2.

Preferably, the valve is designed with the purposive flow rate ($q$) determinable according to the expression:

$$\log_{10} q = 0.301 + 0.0170s \qquad (5)$$

The values of A and B for such design characteristics give the valve a rangeability of about 50 and a minimum regulated flow (expressed as percentage of the maximum attainable flow with the valve in wide open position) of about 2 percent.

Valves in accordance with the present invention can be made to have relatively simple structural features and to provide exceptionally satisfactory characteristics as flow controlling instruments for viscous fluids. They are unusually well suited for utilization with motor proportioning units for their operation. They may be fabricated from practically any metallic or non-metallic corrosion-resisting material of construction that may be best adapted to serve under the conditions involved. They may be utilized with great advantage for the flow control and throttling of practically any viscous liquid which, without handicap, may be a pseudoplastic fluid, especially viscous liquid polymer compositions. Furthermore, the valves are relatively inexpensive to manufacture and compare quite favorably in this regard with the standard, shallow seat plug valves that are available for the handling and control of liquids in turbulent flow.

Figure 3:
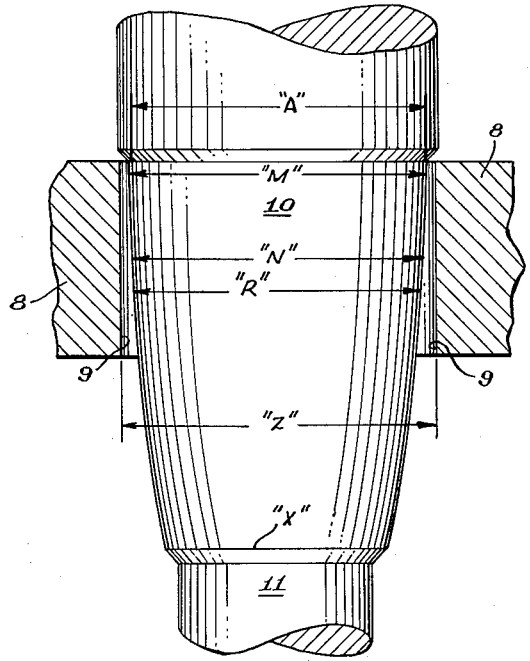
Figure 1:
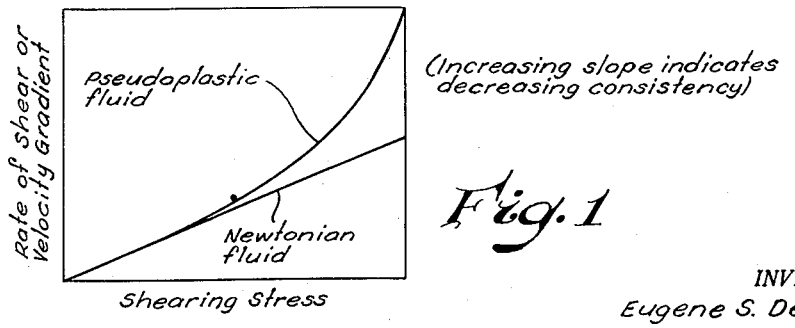

Further features and advantages of the invention will be manifest in the ensuing description and specification, taken in connection with the other two figures of the accompanying drawing that are additional to the already-mentioned FIGURE 1, which schematically represent a valve embodied in accordance with the invention, wherein;

FIGURE 2, in partial cross-section, is a figurative illustration of a valve having the herein-described characteristics and features; and FIGURE 3, a fragmentary cross-sectional view partially in section, illustrates in scale (enlarged from FIGURE 2) a preferred profile of a tapered plug of a valve that is made in accordance with the present invention.

As is shown in FIGURE 2, the valve consists of a body 4 that has an internal cavity 5 hollowed out therein, into and out of which the arbitrarily designated inlet and outlet ports 6 and 7 lead respectively. The precise direction of flow that is selected for operation of the valve is immaterial. The flow of liquid through the valve can suitably be reversed at will. A valve seat 8 is provided in the cavity 5 between the inlet and outlet ports 6 and 7. A deep, cylindrical opening 9 is bored through the seat to provide passage through the valve when the specially tapered plug 10, formed in the described manner, is moved out of the opening to any open position off the seat 8. Ideally the plug 10 is always in the seat while the flow is being controlled. However, if desired, it is possible to arrange to have the plug pulled completely out of the seat to accommodate emergency conditions that may require maximum flow through the valve. The plug 10, as shown, is provided around a cylindrical plunger or stem 11 which extends through the cavity 5 and is movable in and out of the valve body 4 in an up and down manner when the valve is mounted in an upright position. The protuberant tapered plug 10 is provided in a fixed manner intermediately about the stem 11. If desired, as is shown, the bottom portion of the cavity 5 may be provided with a stem-receiving recess 12 in order to positively and accurately guide the plug during its movement into and out of the opening 9 in the seat 8. This however is an optional feature that is generally not necessary when metallic valves and bushings are employed. A relief passageway 13 communicates between the recess 12 and the cavity 5 near the fluid outlet 7. This avoids binding of the valve during changes in its seating due to the possible entrapment of fluid in the recess 12. The uppermost portion of the stem 11 extending from the valve body 4 may be provided with suitable packing means 14 to minimize leakage out of or into the valve.

In designing and providing the tapered plug 10, it is a convenient procedure to establish a trial profile therefor, based on the characteristics of the valve, using the above-mentioned Equation 2. The profile may then be rechecked at two or three plug positions and its applicable positions selected for use in the valve. This is illustrated on the tapered plug 10 that is shown in scale in FIGURE 3 of the drawing. The plug is adapted to close the opening 9 in the seat 8 in which the cylindrical opening has a one-inch diameter bore, indicated by the dimensions "Z," and a depth or opening length of 0.600 inch. The dimension "A" at the uppermost tapered portion of the plug 10 (immediately beneath its flanged shoulder closure portion that directly rests upon and engages the seal and is not a part of the tapered plug proper) has a diameter of 0.9530 inch and is designed to accommodate the flow through valve of a viscous liquid having a pseudoplastic constant "C" of about $5 \times 10^{-4}$ feet to the fourth/pounds-force$^2$. The diameter of the plug at the dimension "N," which is 0.300 inch beneath the diameter at "A," is 0.9216 inch. The diameter of the plug at the dimension "R," which is 0.100 inch beneath the diameter "N," is 0.9102 inch. The diameters "M," "N" and "R" are calculated. The remaining portion of the plug taper may then be easily provided therefrom on an empirical basis. The entire tapered profile of the plug, as expressed in its diameters at 0.100 inch intervals along its length, starting with the diameter "M," are in the following dimension progression of convergingly tapering diameters with a smooth and uniform surface being provided therebetween: 0.9530; 0.9448; 0.9342; 0.9216; 0.9102; 0.8962; 0.8792; 0.8600; 0.8392; 0.8168; 0.7906; 0.7572; 0.7196. The last indicated plug diameter is measured between the outside rim of the bottommost shoulder which necks down from the tapered surface of the plug to the stem 11 and is designated as the dimension "X" in FIGURE 3 of the drawing.

A valve in accordance with the present invention having a tapered plug similar to that depicted in FIGURE 3 of the drawing was utilized in a completely satisfactory manner for considerable periods of time in a flow-proportioning motor-controlled unit having semi-logarithmic response in order to regulate a stream of a viscous liquid having a viscosity at the temperature at which it was handled of from 300 to 500 poises and a zero-sheer viscosity of about 2.76 times $10^{-4}$ pound/hour per square foot. Upon the basis of experimental evidence, the pseudoplasticity constant of the viscous liquid of which the valve design was made was assumed to be about $5 \times 10^{-4}$ feet to the fourth power per pound/foot squared. The liquid consisted of a solution of polyacrylonitrile in an aqueous zinc chloride solvent therefor. The pressure drop across the valve at maximum flow was about 15 pounds per square inch. The flow rate of the valve in wide open position and the flow rates at intermediate settings of the stem were found to be substantially equal in operation to that which could be calculated for with the above data using the expression of Equation 5 herein set forth as characteristic of the valve. The maximum flow rate of the valve under such conditions was about 30 gallons per hour.

It is to be fully understood that many other embodiments of the valve of the present invention can be made besides that which is illustrated without substantially departing from the spirit and scope of the invention as it is particularly set forth and defined in the heretofore appended claims.

What is claimed is:

1. In a control valve for liquids in viscous flow, a means defining a body having an internal cavity therein and formed with inlet and outlet ports leading into and out of said cavity; a valve seat in said cavity positioned between said inlet and outlet ports and having a relatively deep, cylindrical opening formed therein to provide communication between said inlet and outlet ports; a relatively long tapered plug coaxial with the deep opening in said seat and at least coextensive therewith, said tapered plug being formed to provide a constantly uniformly increasing annular space with said seat when said plug is lifted coaxially out of the opening and off said seat, said plug in special arrangement with said seat being further adapted by its tapered configuration to permit the liquid being handled in the range of regulated flow to flow in a viscous, non-turbulent manner from said inlet through the annular space formed by the said tapered plug and said opening in said seat to said outlet at any valve setting in which the plug is lifted from the seat; and means in said valve for changing the position of said plug in said opening with respect to said seat with the limitation that said plug is always at least coextensive with said opening in said seat.

2. A valve according to claim 1 and being further characterized in being able to transmit a liquid in viscous flow therethrough so that the flow rate ($q$) at any valve setting, taken as a volumetric percentage of the maximum flow rate for said valve when wide open, is related to the valve setting ($s$), taken as a measured percentage of the total lift of the plug off the seat when said valve is wide open, and is determinable according to the expression:

$$q = \phi s$$

and the rate of flow (Q), at any valve setting, through the annular space between the tapered plug and the cylindrical opening in the seat is determinable according to the expression:

$$Q = \frac{bY^3}{12u} \cdot \frac{dP}{dL}\left[1 + \frac{3}{20}CY^2\left(\frac{dP}{dL}\right)^2\right]$$

wherein, in consistent units of measure, $b$ is the mean circumference of the annular channel opening at its narrowest point between the tapered plug and the seat; $Y$ is the radial clearance of the annular channel opening at its narrowest point between the tapered plug and the seat; $L$ is the differential length of the passage measured from the top of the seat to the termination of the portion of the plug that is within the seat bore; $P$ is the differential pressure drop of the liquid across the valve; $u$ is the zero-shear viscosity of the viscous liquid being handled; and $C$ is the pseudoplasticity constant of the liquid.

3. A valve according to claim 1 and being further characterized in being able to transmit a liquid in viscous flow therethrough so that the flow rate ($q$) at any valve setting, taken as a volumetric percentage of the maximum flow rate for said valve when wide open, is related to the valve setting ($s$) taken as a measured percentage of the total lift of the plug off the seat when said valve is wide open, and is determinable according to the expression:

$$\log_{10} q = A + Bs$$

wherein A is a constant that sets the lower regulated flow limit of the valve and is the logarithm of the minimum flow that is desired to be regulated in the valve, expressed as a percentage of the maximum attainable flow with the valve in a wide open position, and B is a constant that is selected in order to provide $q$ with a value of 100 percent when $s$ is 100 percent; and the rate of flow ($q$), at any valve setting, through the annular space between the tapered plug and the cylindrical opening in the seat is determinable according to the expression:

$$Q = \frac{bY^3}{12u} \cdot \frac{dP}{dL}\left[1 + \frac{3}{20}CY^2\left(\frac{dP}{dL}\right)^2\right]$$

wherein, in consistent units of measure, $b$ is the mean circumference of the annular channel opening at its narrowest point between the tapered plug and the seat; $Y$ is the radial clearance of the annular channel opening at its narrowest point between the tapered plug and the seat; $L$ is the differential length of the passage measured from the top of the seat to the termination of the portion of the plug that is within the seat bore; $P$ is the differential pressure drop of the liquid across the valve; $u$ is the zero-shear viscosity of the viscous liquid being handled; and $C$ is the pseudoplasticity constant of the liquid.

4. A valve according to claim 1 and being further characterized in being able to transmit a liquid in viscous flow therethrough so that the flow rate ($q$) at any valve setting, taken as a volumetric percentage of the maximum flow rate for said valve when wide open, is related to the valve setting ($s$), taken as a measured percentage of the total lift of the plug off the seat when said valve is wide open, and is determinable according to the expression:

$$\log_{10} q = 0.301 + 0.0170s$$

and the rate of flow (Q), at any valve setting, through the annular space between the tapered plug and the cylindrical opening in the seat is determinable according to the expression:

$$Q = \frac{bY^3}{12u} \cdot \frac{dP}{dL}\left[1 + \frac{3}{20}CY\left(\frac{dP}{dL}\right)^2\right]$$

wherein, in consistent units of measure, $b$ is the mean circumference of the annular channel opening at its narrowest point between the tapered plug and the seat; $Y$ is the radial clearance of the annular channel opening at its narrowest point between the tapered plug and the seat; $L$ is the differential length of the passage measured from the top of the seat to the termination of the portion of the plug that is within the seat bore; $P$ is the differential pressure drop of the liquid across the valve; $u$ is the zero-shear viscosity of the viscous liquid being handled, and $C$ is the pseudoplasticity constant of the liquid.

References Cited in the file of this patent

UNITED STATES PATENTS

| | | |
|---|---|---|
| 1,228,294 | Carnell | May 29, 1917 |
| 1,825,378 | Wilson | May 27, 1926 |
| 2,061,852 | Schweitzer | Nov. 24, 1936 |
| 2,297,535 | Bryant | Sept. 29, 1942 |
| 2,432,082 | Bilyeu | Dec. 9, 1947 |
| 2,685,294 | Gold | Aug. 3, 1954 |

FOREIGN PATENTS

| | | |
|---|---|---|
| 1,639 | Germany | 1877 |